(12) United States Patent
Godinez

(10) Patent No.: US 6,722,701 B1
(45) Date of Patent: Apr. 20, 2004

(54) QUICK CONNECT COUPLING HAVING A SHIELDED FUSE

(75) Inventor: Jose J. Ortiz Godinez, Jalisco (MX)

(73) Assignee: Forgamex S.A. DE C.V., Guadalajara (MX)

( * ) Notice: Subject to any disclaimer, the term of this patent is extended or adjusted under 35 U.S.C. 154(b) by 0 days.

(21) Appl. No.: 08/781,378

(22) Filed: Jan. 21, 1997

(51) Int. Cl.[7] ............................. F16L 29/02; F16K 17/40

(52) U.S. Cl. ........................ 285/1; 285/2; 285/388; 251/149.4

(58) Field of Search ......................... 285/1, 2, 381.1, 285/388; 251/149.6, 149.4

(56) References Cited

U.S. PATENT DOCUMENTS

| | | | | |
|---|---|---|---|---|
| 4,825,893 A | * | 5/1989 | Gailey | 785/1 |
| 4,911,194 A | * | 3/1990 | Lechner | 285/1 |
| 5,330,155 A | * | 7/1994 | Lechner | 251/149.6 |
| 5,540,250 A | * | 7/1996 | Mullins | 285/1 |
| 5,582,201 A | * | 12/1996 | Lee et al. | 251/149.6 |
| 5,979,867 A | * | 11/1999 | Ortiz Godinez | 251/149.4 |

* cited by examiner

Primary Examiner—Eric K. Nicholson
(74) Attorney, Agent, or Firm—Fulbright & Jaworski, LLP

(57) ABSTRACT

An invention coupling for LP gas or similar fuel source systems is disclosed. The coupling includes a nipple having a nose and a recess, a nut notably disposed in the recess and a fuse disposed between the nut and the nose. The coupling automatically decouples from the fuel source when the fuse acts and shuts off the fuel flow.

15 Claims, 2 Drawing Sheets

QUICK CONNECT COUPLING HAVING A SHIELDED FUSE

This application is a continued Prosecution Application of application Serial No. 08/781,378, filed Jan. 21, 1997.

FIELD OF THE INVENTION

The present invention relates generally to conduit couplings for fluid containing cylinders. More particularly, the invention relates to LP gas conduit couplings that include a fuse for automatic disconnection in the event of fire or potential fire.

BACKGROUND OF THE INVENTION

Traditional LP gas valve connectors have used a P.O.L. nipple surrounded by a left hand nut. Generally, the nut threads into the outlet section of the cylinder valve with a 0.880" thread at 14 threads/inch.

Many LP gas valve connectors now have included a heat sensitive nut to couple the nipple to the gas cylinder. The nut is designed to fail if the temperature reaches a temperature that could cause or indicate fire. Disconnection of the fluid-carrying conduits triggers an interruption in the fluid flow path. The interruption of the fluid flow path halts the flow of fuel, such as LP gas, to the heat source to prevent or reduce the possibility of fire.

The heat sensitive nut may be exposed to direct sunlight. This exposure to sunlight has caused such nuts to soften unevenly or in some cases fail. Such softening may distort the assembly producing premature decoupling or interruptions in fluid flow. It may also cause misalignment between the nipple and the nut creating problems in coupling and decoupling. Thus, a need existed to prevent direct exposure to sunlight of the heat sensitive material in the coupling.

Other couplings have been designed where only a portion of the nut is made of a heat sensitive material. At the very least, those systems require that the nut be replaced once the system fails. Thus, a need exists to reduce replacement costs for such systems.

SUMMARY OF THE INVENTION

The present invention includes a coupling system comprising a nipple, a check valve, a nut rotatably disposed around the nipple, and a fuse disposed around the nipple between the nut and the fluid entry end of the nipple. The fuse is composed of a heat sensitive material.

The fuse is configured to deform when subject to heat to ensure that the check valve is triggered closing off the flow of fluid. Furthermore, there is no need to replace the nut after failure—only the fuse must be replaced. The present invention reduces and in some case eliminates misalignment between nut and nipple because of its long, direct guiding surface contact between nipple and nut.

The present invention overcomes or assists in overcoming the problems associated with prior art couplings. Other advantages and features of the invention will become apparent upon reading the following detailed description and upon reference to the drawings.

DESCRIPTION OF THE PREFERRED EMBODIMENT

Figure 1:
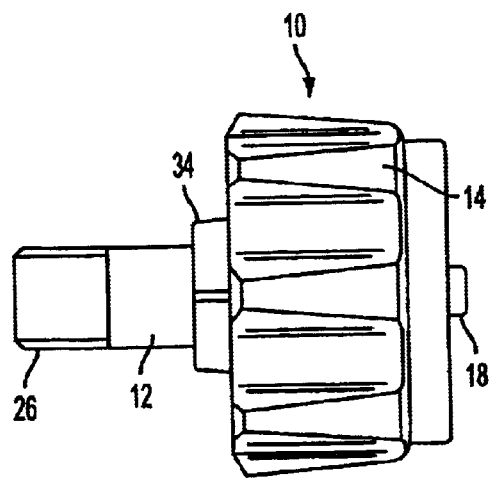
FIG. 1 is a side view of the invention coupling.
Figure 3:
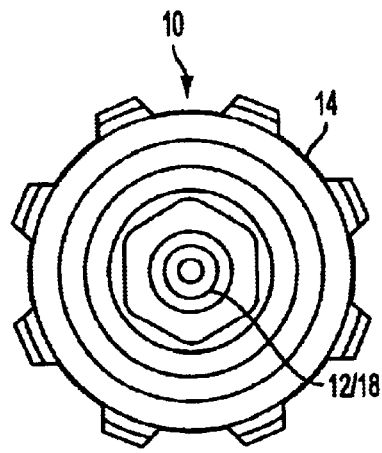
FIG. 3 is a front view of the invention coupling.
Figure 4:
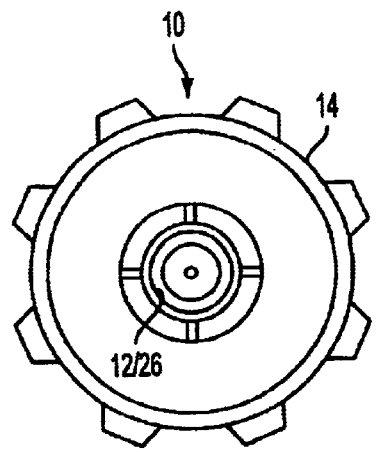
FIG. 4 is a rear view of the invention coupling.
Figure 2:
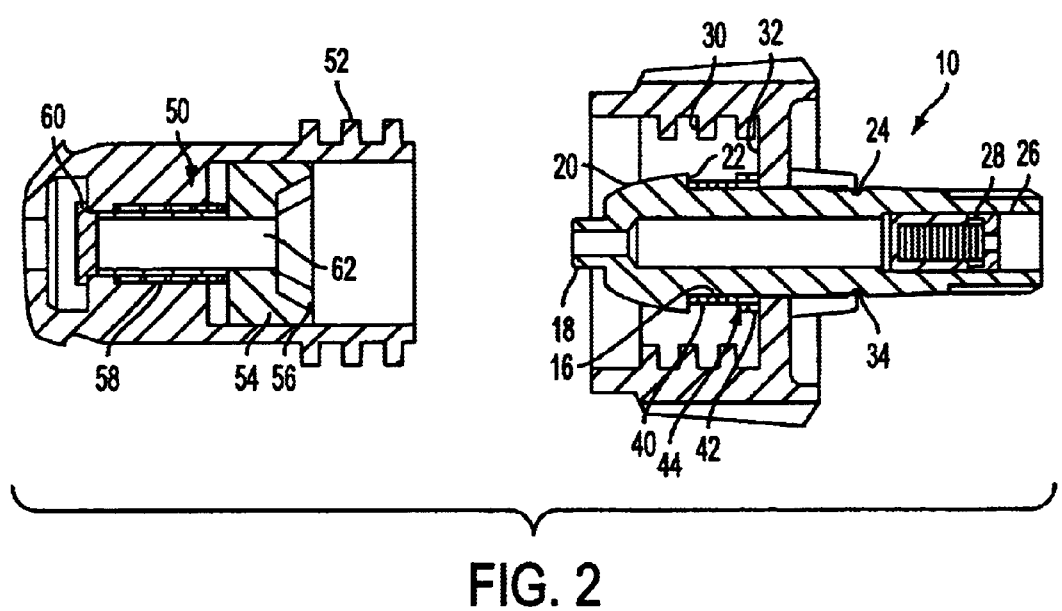
FIG. 2 is a cross sectional side view of the invention coupling and a section of the valve body.

A preferred coupling 10 includes a nipple 12, a nut 14 and a fuse 16. Those components are shown best in FIGS. 1 and 2.

The nipple 12 includes a nose 18, a head 20, a shoulder 22, a recess 24 and a threaded end 26. The preferred recess 24 provides for sufficient travel of the nut 14 for both coupling and decoupling. The nipple 12 is made of a heat-resistant material, preferably a Brass 360-type material.

A flow control device 28 is preferably disposed inside the nipple 12 near the threaded end. The preferred flow control device includes a stainless steel spring, a plastic stem and a Brass 360 plug.

The nut 14 includes threads 30, base surface 32, and ring section 34. The nut 14 is rotably disposed around the nipple 12 where the ring section 34 rotatably engages recess 24. The nut 14 may be composed of a heat-resistant material, preferably a Nylon Durethan.

The fuse 16 is disposed around the nipple 12, preferably between the nipple shoulder 22 and the nut base surface 32. The fuse 16 is preferably composed of Markoblend UT 403 that softens between 116° C. and 149° C. When the nut 14 and a cylinder valve section 50 are coupled, the fuse 16 is shielded from direct sunlight by the coupled pieces.

The fuse 16 is preferably configured with at least two distinct sections 40 and 42. The first preferred section 40 is cylindrical where the inside diameter is equal to the outside diameter of the nipple 12 between the shoulder 22 and the recess 24. The second section 42 is also preferably cylindrical where its inside diameter is greater than the inside diameter of the first section 40. Sections 40 and 42 are connected by a ring section 44.

The preferred coupling system includes the valve section 50 connected to a fluid fuel source. The valve section 50 includes threads 52 and a check valve 54. The check valve 54 includes sealing surface 56, spring 58, seat 60 and stem 62.

The length of the second section 42 is equal to or greater than the length of travel necessary to actuate the check valve 54. In other words, if the fuse 16 deforms, the spring 58 will force the check valve 54 shut. Other shapes of the fuse 16 may also be used, provided sufficient travel is attained to actuate the check valve 54 when the fuse 16 fails. For instance, either configuration may be conical in shape provided sufficient travel is allowed.

The invention is susceptible to various modifications and alterations and is not intended to be limited to the particular forms disclosed. Instead, the invention should be interpreted to encompass all modifications, equivalents and alternatives falling within the spirit and scope of the invention and defined by the appended claims.

What is claimed is:

1. A coupling comprising:
   (a) a nipple including a shoulder and a recess;
   (b) a separate nut rotatably disposed around the recess of the nipple; and
   (c) a separate fuse disposed around the nipple between the shoulder of the nipple and the nut, the fuse:
      (i) comprising a material that softens when exposed to temperatures that indicate fire; and
      (ii) being shielded by the nut and not exposed to sunlight when the coupling is coupled to an outlet of a fluid source to prevent deformation from exposure to sunlight.

2. The coupling of claim 1 where the fuse comprises a material that softens at temperatures above 115° C.

3. The coupling of claim 1 where the fuse comprises a thermoplastic material that softens at temperatures above 115° C.

4. The coupling of claim 1 where the fuse comprises a material that softens at temperatures between 116° C. and 149° C.

5. The coupling of claim 1 where the fuse is replaceable.

6. The coupling of claim 1 where the nipple comprises a check valve.

7. A coupling system comprising:

(a) a fluid source comprising an outlet;

(b) a coupling adapted to couple to the outlet, the coupling comprising:

(i) a nipple including a shoulder and a recess, the nipple being adapted to couple to the outlet;

(ii) a separate nut rotatably disposed around the nipple, the nut being adapted to couple to the fluid source; and (iii) a separate fuse disposed around the nipple between the shoulder of the nipple and the nut so that when the system is coupled, the fuse is not exposed to sunlight, the fuse comprising a material that softens when exposed to temperatures that indicate fire.

8. The coupling system of claim 7 where the fluid source comprises a check valve.

9. The coupling system of claim 7 where the nut is rotatably disposed around the recess of the nipple.

10. The coupling system of claim 7 where the nipple comprises a flow control device.

11. The coupling system of claim 10 where the flow control device comprises a check valve.

12. The coupling system of claim 7 where the fuse comprises a thermoplastic material.

13. The coupling system of claim 7 where the fuse comprises a material that softens at temperatures above 115° C.

14. The coupling system of claim 7 where the fuse comprises a thermoplastic material that softens at temperatures above 115° C.

15. The coupling system of claim 7 where the fuse comprises a material that softens at temperatures between 116° C. and 149° C.

* * * * *